United States Patent
Allais et al.

(10) Patent No.: US 10,884,411 B1
(45) Date of Patent: Jan. 5, 2021

(54) AUTONOMOUS VEHICLE CONTROLLED BASED UPON A LIDAR DATA SEGMENTATION SYSTEM AND AN ALIGNED HEIGHTMAP

(71) Applicant: GM GLOBAL TECHNOLOGY OPERATIONS LLC, Detroit, MI (US)

(72) Inventors: Andrea Allais, San Francisco, CA (US); Adam Samuel Cadien, San Francisco, CA (US); Elliot Branson, San Francisco, CA (US); William Gongshu Xie, San Francisco, CA (US); Micah Christopher Chambers, Oakland, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 16/054,049

(22) Filed: Aug. 3, 2018

(51) Int. Cl.

| | |
|---|---|
| *G05D 1/00* | (2006.01) |
| *G05D 1/02* | (2020.01) |
| *B60W 10/06* | (2006.01) |
| *B60W 10/20* | (2006.01) |
| *G06N 3/08* | (2006.01) |
| *B60W 10/18* | (2012.01) |
| *G01S 7/48* | (2006.01) |
| *G01S 17/931* | (2020.01) |

(52) U.S. Cl.
CPC ............ *G05D 1/0088* (2013.01); *B60W 10/06* (2013.01); *B60W 10/18* (2013.01); *B60W 10/20* (2013.01); *G01S 17/931* (2020.01); *G05D 1/0212* (2013.01); *G05D 1/0238* (2013.01); *G06N 3/08* (2013.01); *G01S 7/4802* (2013.01); *G05D 2201/0212* (2013.01)

(58) Field of Classification Search
CPC .. G05D 1/0088; G05D 1/0212; G05D 1/0238; G05D 2201/0212; G01S 17/931; G01S 7/4802; B60W 10/06; B60W 10/20; B60W 10/18; G06N 3/08
See application file for complete search history.

(56) References Cited

U.S. PATENT DOCUMENTS

| | | |
|---|---|---|
| 8,718,837 B2 | 5/2014 | Wang et al. |
| 8,825,260 B1 | 9/2014 | Silver et al. |

(Continued)

FOREIGN PATENT DOCUMENTS

| | | |
|---|---|---|
| WO | 2018108832 A1 | 6/2018 |

*Primary Examiner* — Alan D Hutchinson
(74) *Attorney, Agent, or Firm* — Medley, Behrens & Lewis, LLC

(57) ABSTRACT

An autonomous vehicle is described herein. The autonomous vehicle includes a lidar sensor system. The autonomous vehicle additionally includes a computing system that executes a lidar segmentation system, wherein the lidar segmentation system is configured to identify objects that are in proximity to the autonomous vehicle based upon output of the lidar sensor system. The computing system further includes a deep neural network (DNN), where the lidar segmentation system identifies the objects in proximity to the autonomous vehicle based upon output of the DNN. The computing system is further configured to align a heightmap to lidar data output by the lidar sensor system based upon output of the DNN. The lidar segmentation system can identify objects in proximity to the autonomous vehicle based upon the aligned heightmap.

20 Claims, 9 Drawing Sheets

(56) References Cited

U.S. PATENT DOCUMENTS

| | | | |
|---|---|---|---|
| 10,486,485 B1 * | 11/2019 | Levinson | B60W 50/0098 |
| 2010/0026555 A1 | 2/2010 | Whittaker et al. | |
| 2010/0063672 A1 | 3/2010 | Anderson | |
| 2018/0188041 A1 | 6/2018 | Chen et al. | |
| 2018/0357907 A1 * | 12/2018 | Reiley | G08G 1/202 |
| 2019/0137287 A1 * | 5/2019 | Pazhayampallil | G05D 1/0291 |
| 2019/0234745 A1 * | 8/2019 | Lee | G01C 21/32 |

* cited by examiner

AUTONOMOUS VEHICLE CONTROLLED BASED UPON A LIDAR DATA SEGMENTATION SYSTEM AND AN ALIGNED HEIGHTMAP

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Conventionally, autonomous vehicles are configured to identify locations of different objects in a driving environment based upon different sensor signals. For example, a radar system can identify a range from the autonomous vehicle to another vehicle in the driving environment. In another example, an object recognition system may be configured to receive images output by a camera and to identify relative positions of objects captured in the images.

In some situations, however, it may be difficult to determine what objects are at which locations based upon the sensor signals output by the sensor systems of the autonomous vehicle. For example, in a lidar point cloud representative of the driving environment, it may be difficult to determine by way of conventional algorithms what points are representative of same objects and what points are representative of different objects in the driving environment. Conventionally, algorithms based upon human-generated rules have been used to perform segmentation of a lidar point cloud to identify objects and their locations in the driving environment. For example, an algorithm may identify two points in a lidar point cloud as belonging to a same object based upon the points being within 50 centimeters of one another. This conventional approach may not be robust to variations in the driving environment, and can result in possible errors with respect to object identification by the autonomous vehicle. For instance, various conventional algorithms for performing segmentation of a lidar point cloud may perform poorly when certain types of objects are present in a driving environment (e.g., groups of closely-spaced pedestrians, vegetation, non-convex objects, etc.)

SUMMARY

The following is a brief summary of subject matter that is described in greater detail herein. This summary is not intended to be limiting as to the scope of the claims.

Described herein are various technologies pertaining to controlling operation of an autonomous vehicle. With more specificity, described herein are various technologies pertaining to segmentation of a lidar point cloud, wherein the lidar point cloud is representative of positions of objects in the driving environment of the autonomous vehicle at one or more points in time. With still more specificity, a lidar data segmentation system is described herein, wherein the lidar data segmentation system comprises a neural network that is trained to output data indicative of a probability that a point in a lidar point cloud is representative of at least one of ground (e.g., a road surface, a sidewalk surface, or other ground surface) or vegetation. The lidar data segmentation system can assign a label to the point based upon the probability indicated by the neural network output, the label indicating a classification of a type of object that the point is expected to represent. The lidar segmentation system then performs a segmentation of the lidar point cloud based in part upon the label assigned to the point.

In an example, an autonomous vehicle includes a lidar sensor system that comprises at least one lidar sensor, and a lidar segmentation system. The lidar sensor system outputs lidar data based on sensor signals received from the at least one lidar sensor, where the lidar data is indicative of positions of objects in the driving environment of the autonomous vehicle at one or more times. In an exemplary embodiment, the lidar data comprises a three-dimensional lidar point cloud, wherein each point in the point cloud indicates a three-dimensional position of an object or surface of an object in the driving environment of the autonomous vehicle. The lidar sensor system outputs the lidar data to the lidar segmentation system, whereupon the lidar segmentation system generates a segmentation of the lidar data. By way of example, the segmentation indicates which points in the lidar point cloud belong to same objects in the driving environment. Further, the segmentation can indicate a plurality of groups each representative of a different respective object in the driving environment, wherein each group includes one or more points in the lidar point cloud that are representative of the object.

The lidar segmentation system, in connection with generating the segmentation of the lidar data, receives the lidar data from the lidar sensor system and identifies various input features with respect to each of the points represented in the lidar data. By way of example, and not limitation, input features for a point in a lidar point cloud can include distance to a next-closest point in the point cloud, angle formed by the point and adjacent points in the point cloud, mean and variance of position relative to a local neighborhood of points in the point cloud, etc. The lidar segmentation system receives the input features for each of the points and provides the input features as input to a deep neural network (DNN). The DNN is trained to output, based upon the input features for a point, a probability that the point is representative of ground, vegetation, or another type of object. The lidar segmentation system assigns labels to points in the point cloud based upon the output of the DNN, the labels indicating a type of object that the point is expected to represent. The lidar segmentation system can then compute a segmentation of the lidar point cloud based upon the labels assigned to the points in the lidar point cloud.

In further embodiments, the autonomous vehicle is configured to align one or more sets of labeled data with one or more sensor signals based upon the output of the DNN in real time during operation of the autonomous vehicle in the driving environment. In an example, the autonomous vehicle comprises a data alignment system, and a data storage system that stores labeled data pertaining to the driving environment (e.g., a semantic map of the driving environment, a height map of the driving environment, etc.). The data alignment system is configured to align labeled data stored in the data storage system with the lidar data output by the lidar sensor system. The data alignment system receives the output of the DNN and identifies a plurality of points that are indicated in the output of the DNN as having a high probability (e.g., greater than 90%, greater than 95%, or greater than 99%) of being representative of ground cover. The data alignment system computes an alignment between the labeled data and the points identified as having a high probability of being representative of ground cover. A control system of the autonomous vehicle then controls operation of the autonomous vehicle in the driving environment based upon the alignment. By way of example, the control system of the autonomous vehicle can determine that a direction of travel is unobstructed based jointly upon the lidar data and the labeled data, wherein joint consideration of the lidar data and the labeled data is based upon the alignment computed by the data alignment system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
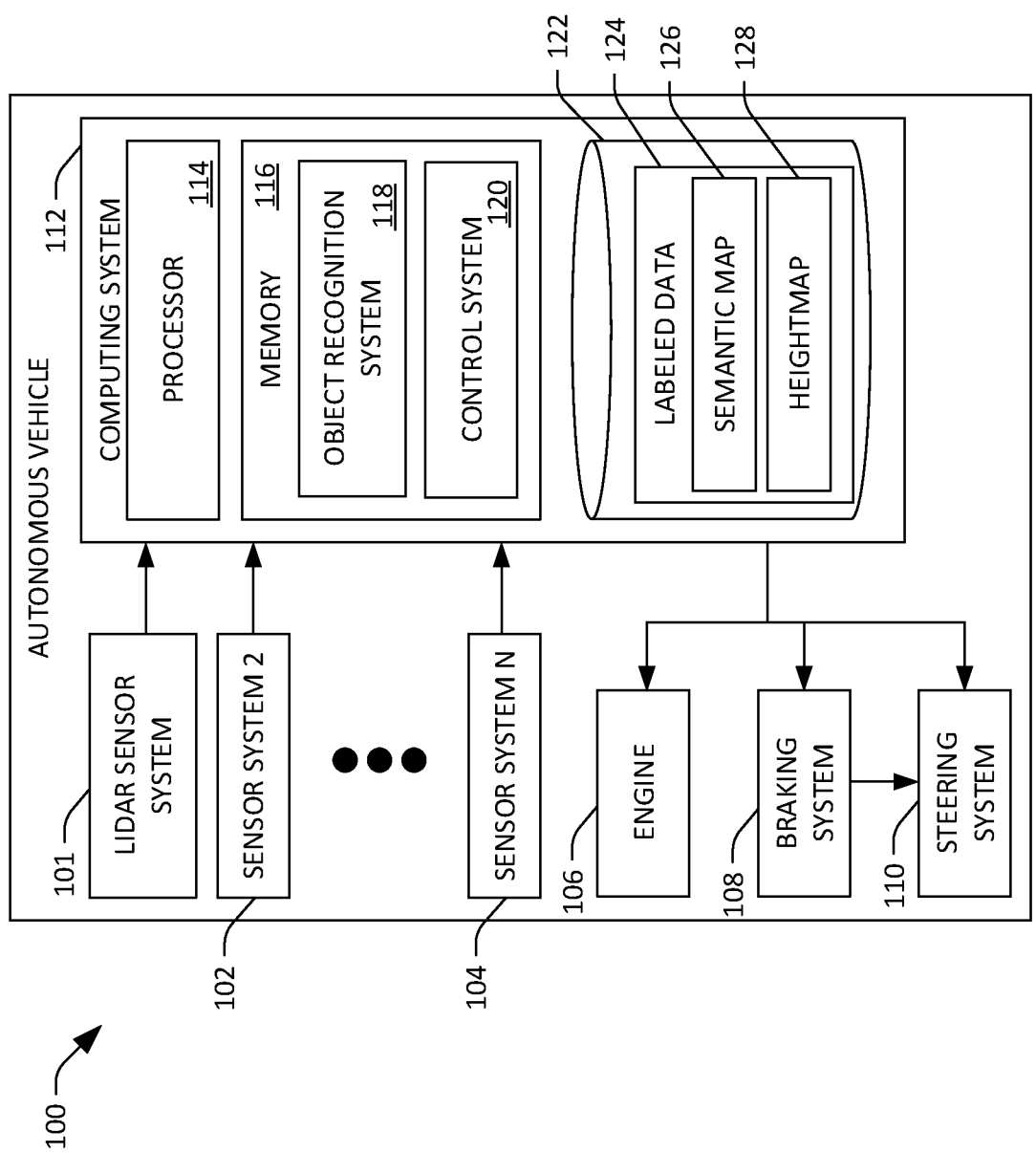
FIG. 1 illustrates an exemplary autonomous vehicle.

Various technologies pertaining to controlling operation of an autonomous vehicle based upon lidar segmentation data generated through use of a DNN are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a lidar sensor system 101 and a plurality of additional sensor systems 102-104 (a second sensor system 102 through an Nth sensor system 104). The sensor systems 102-104 may be of different types and are arranged about the autonomous vehicle 100. For example, the second sensor system 102 may be a radar sensor system and the Nth sensor system 104 may be a camera (image) system. Other exemplary sensor systems include GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine brake, brake pads, actuators, a regenerative braking system, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 101-104 and is further in communication with the engine 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Figure 2:
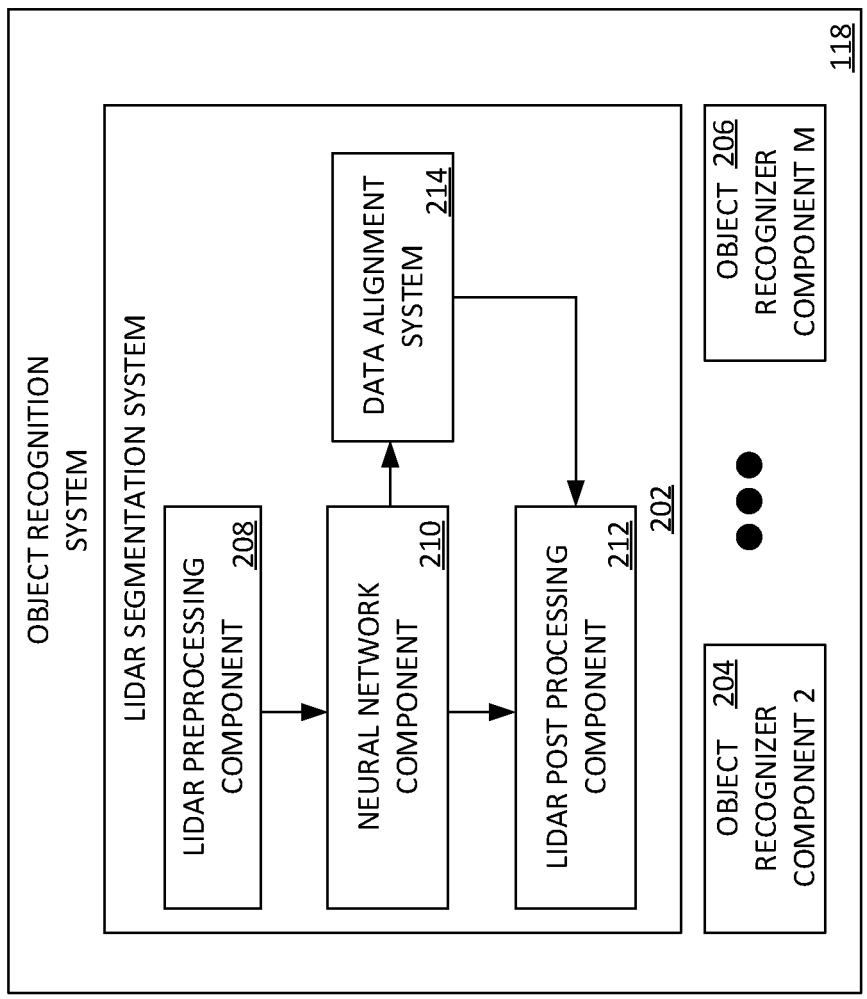
FIG. 2 is a functional block diagram of an exemplary object recognition system included within an autonomous vehicle.

The memory 116 comprises an object recognition system 118 that is configured to identify objects (in proximity to the autonomous vehicle 100) captured in sensor signals output by the sensor systems 101-104. As will be described in greater detail below (and referring briefly to FIG. 2), the object recognition system 118 includes a lidar segmentation system 202, and may further include a plurality of additional object recognition components 204-206 (a second objection recognition component 204 through an Mth objection recognition component 206), wherein the lidar segmentation system 202 and the objection recognition components 204-206 are configured to output data indicative of positions and/or predefined types of objects in a driving environment of the autonomous vehicle 100. These predefined types of objects can include, but are not limited to, pedestrian, bike, car, truck, bus, ground cover (e.g., paved roadways, dirt, grass) etc. Each of the object recognizer components 202-206 independently generates output based upon at least one sensor signal. For instance, the lidar segmentation system 202 outputs data indicative of positions of objects in the driving environment of the autonomous vehicle 100 based upon lidar data output by the lidar sensor system 101. In further examples, the second object recognizer component 204 outputs data indicative of types of objects based upon images output by a camera, the Mth object recognizer component 206 outputs data indicative of ranges to objects based upon radar signals, etc.

The memory 118 additionally includes a control system 120 that is configured to receive output of the object recognition system 118, and is further configured to control at least one of the mechanical systems of the autonomous vehicle 100 (the engine 106, the braking system 108, and/or the steering system 110) based upon the output of the object recognition system 118.

Figure 3A:
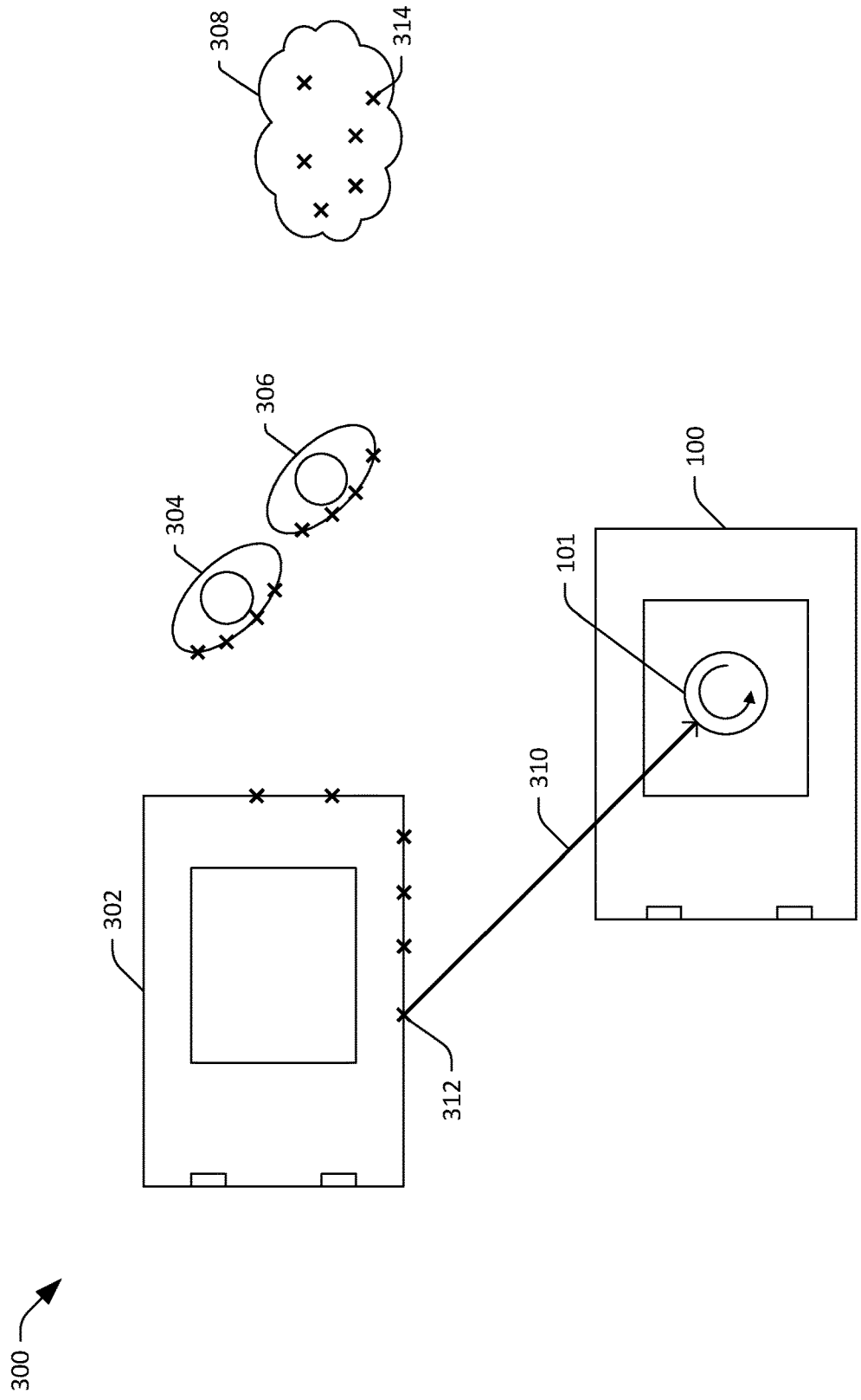
FIG. 3A is a top-down view of an exemplary driving environment of an autonomous vehicle.
Figure 3B:
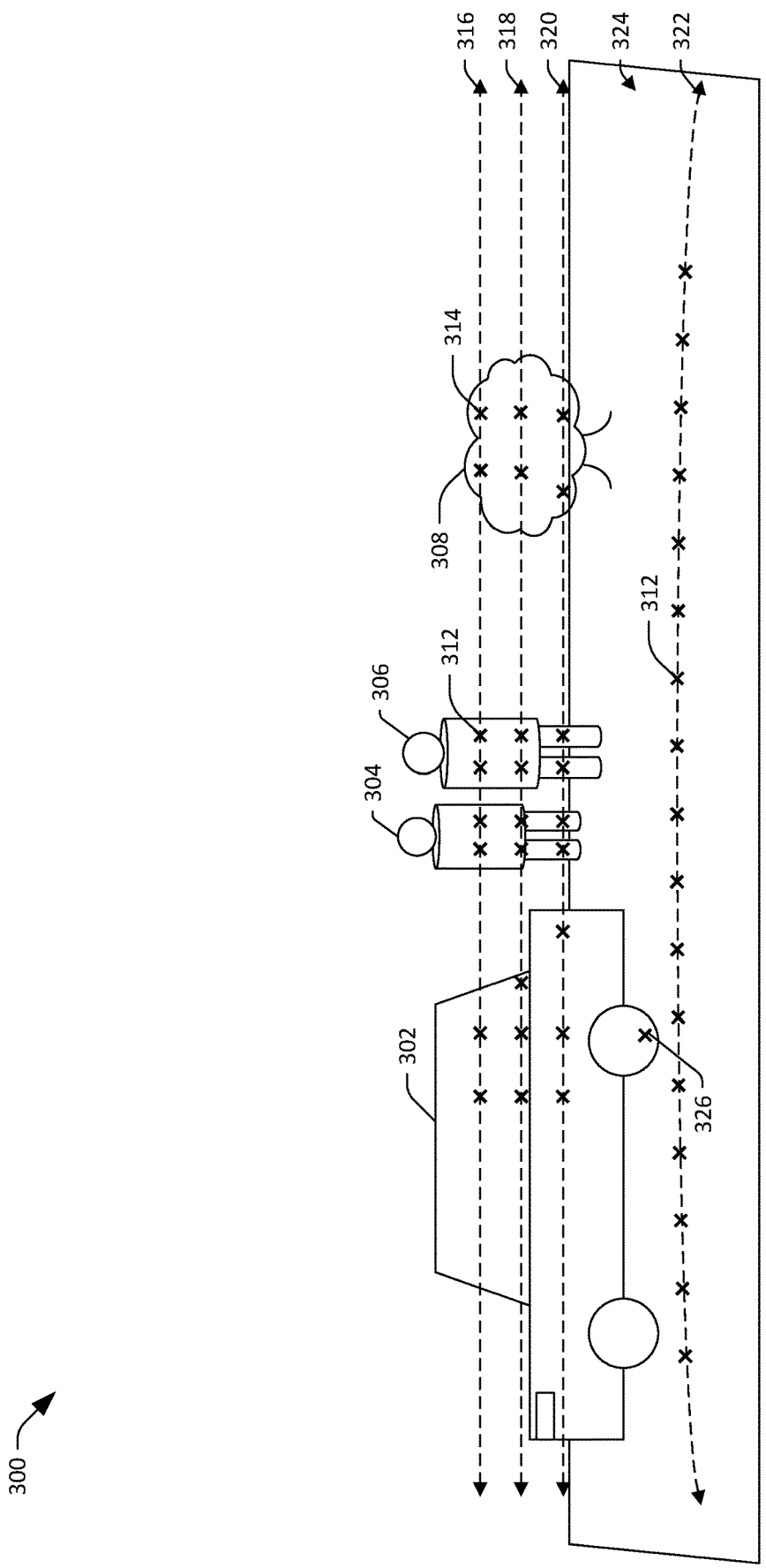
FIG. 3B is a side view of the exemplary driving environment depicted in FIG. 3A.

Exemplary operation of the autonomous vehicle 100 is now set forth. FIGS. 3A and 3B depict different views of an exemplary driving environment 300 in which the autonomous vehicle 100 operates. With reference now to FIG. 3A, the autonomous vehicle 100 is depicted in the driving environment 300, wherein the driving environment includes a first vehicle 302, two pedestrians 304, 306 standing to the right of the vehicle 302, and a bush 308 that stands to the right of the pedestrians 304, 306. The autonomous vehicle 100 emits a laser beam 310 into the driving environment 300 (e.g., by way of the lidar sensor system 101). The laser beam 310 is scanned 360° around the vehicle 100, and impinges upon the various objects 302-308 in the environment 300. The lidar sensor system 101 receives reflections of the beam 310, and based upon such reflections outputs data indicative of positions of a plurality of points of intersection 312 of the beam 310 with the objects 302-308 in the driving environment 300. By way of example, the lidar sensor system 101 outputs data indicating a three-dimensional position of each of the points 312 (e.g., relative to the autonomous vehicle 100, relative to a point of reference in the driving environment 300 or outside of the driving environment 300, etc.).

It is to be understood that while a single laser beam 310 and a plurality of points of intersection 312 of the beam 310 with objects 302-308 are depicted in FIG. 3A, the lidar sensor system 101 can emit a plurality of laser beams into a driving environment of the autonomous vehicle 100. For instance, and referring now to FIG. 3B, a side view of the objects 302-308 in the driving environment 300 is depicted. In exemplary embodiments, the lidar sensor system 101 emits a plurality of laser beams into the driving environment of the vehicle 100, wherein each of the beams has a different angular alignment with respect to a horizontal reference plane of the vehicle 100. Further, each of a plurality of sensors in the lidar sensor system 101 may be aligned with a different respective lidar beam emitted by the lidar sensor system 101, such that the lidar sensor system 101 outputs data indicative of a plurality of points of intersection for each of the plurality of beams over a period of time. As depicted in FIG. 3B, the plurality of laser beams scan across the objects 302-308 in the driving environment 300 and intersect the objects along scan lines 316-320. Each of the points 312 where a laser beam of the lidar sensor system 101 intersects one of the objects 302-308 in the driving environment lies along one of the scan lines 316-322. Hence, each of the plurality of lidar sensors in the lidar sensor system 101 outputs data indicative of a point of intersection of a respective laser beam with various objects in the driving environment 300 along a respective scan line. A lidar point cloud output by the lidar sensor system 101 can therefore be considered a rastered image of objects in the driving environment, comprising as many scan lines as lasers are included in the lidar sensor system 101. It is to be appreciated that over the period of a 360° scan of a driving environment of the autonomous vehicle 100, the lidar sensor system 101 can output data indicative of positions of a larger number of points than are depicted in FIGS. 3A and 3B (e.g., tens of thousands of points, hundreds of thousands of points, millions of points, etc.). Furthermore, it is to be appreciated that points of intersection of laser beams with ground cover may be represented in a lidar point cloud output by the lidar sensor system 101. For example, the scan line 322 lies substantially along a ground surface 324, and the points of intersection 312 lying along the scan line 322 represent intersections of a laser beam of the lidar sensor system 101 with the ground surface 324.

For many objects in a driving environment of an autonomous vehicle, the points of intersection of laser beams emitted by the lidar sensor system 101 are relatively regularly arranged along surfaces of the object. For instance, and referring again to FIG. 3A, the points of intersection 312 of the beam 310 with the vehicle 302 are regularly arranged along surfaces of the vehicle (e.g., doors, side panels, etc.). However, for some objects, the points of intersection with the laser beams are irregularly positioned. For instance, the points of intersection 312 in the driving environment include points of intersection 314 with the bush 308. The points of intersection 314 may not be regularly spaced around apparent boundaries of the bush 308, for example due to movement of branches and leaves of the bush 308 in wind, irregular positioning of branches and leaves of the bush 308, etc. These irregularities associated with vegetation in a driving environment of an autonomous vehicle can interfere with conventional lidar point cloud segmentation systems that identify objects in a lidar point cloud. By way of example, a conventional lidar point cloud segmentation system operating in the driving environment 300 may determine that the points of intersection with the bush 308 represent multiple objects rather than a single object. In another example, a conventional lidar point cloud segmentation system may determine that points of intersection with the bush 308 represent the same object as points of intersection representative of the pedestrian 306

Referring again to FIG. 2, various details pertaining to the lidar segmentation system 202 are now described. The lidar segmentation system 202 is configured to identify points in a lidar point cloud that are likely to be representative of vegetation and/or ground cover, and to perform a segmentation of the lidar point cloud that takes appropriate consideration of such objects. For example, the lidar segmentation system 202 can be configured to identify adjacent points that are likely to be representative of vegetation, and to consider these points to be representative of a same object (e.g., a single bush). In another example, the lidar segmentation system 202 can be configured to identify points that are likely to be representative of ground cover, and to separate these points from adjacent points in the lidar point cloud that are not likely to be representative of ground cover. Hence, the lidar segmentation system 202 can be prevented from erroneously determining that non-ground objects are part of ground cover in the driving environment of the autonomous vehicle 100.

The lidar segmentation system 202 further comprises a lidar preprocessing component 208, a neural network component 210, and a lidar postprocessing component 212. The lidar segmentation system 202 receives lidar data from the lidar sensor system 101, wherein the lidar data is indicative of positions of surfaces of a plurality of objects in a driving environment of the autonomous vehicle 100. The lidar preprocessing component 208 performs various processing operations over the lidar data and outputs a plurality of input features to the neural network component 210. The neural network component 210 is configured to output a probability that a point is representative of at least one of ground cover or vegetation based upon the input features associated with the point. The lidar postprocessing component 212 then performs a segmentation of the lidar point cloud based upon the probability output by the neural network component 210.

Exemplary operations of the lidar segmentation system 202 are now set forth. The lidar segmentation system 202 receives a lidar point cloud from the lidar sensor system 101, wherein the point cloud is indicative of positions of points on surfaces of the objects 302-308 (and other objects that may be present) in the driving environment 300 of the vehicle 100 (e.g., as described above with respect to FIGS. 3A and 3B). The lidar preprocessing component 208 performs an analysis over the points in the point cloud to identify various features relative to each of the points in the point cloud. By way of example, the lidar preprocessing component 208 parameterizes the point cloud according to a training scheme used to learn the neural network component 210. For instance, the lidar preprocessing component 208 can compute, for each of the points in the point cloud, a distance to a next-closest point in the point cloud, a distance from the point to the autonomous vehicle 100, a number of points within a threshold distance of the point, etc., where such features are provided as input to a DNN during training of the DNN (e.g., as described below with respect to FIG. 4). The preprocessor component 208 then provides these features as input features to the neural network component 210 for each of the points in the point cloud.

The neural network component 210 comprises a DNN that has a plurality of layers including an input layer, a plurality of hidden layers (e.g., greater than 5 layers, greater than 10 layers, greater than 50 layers, etc.), and an output layer. Responsive to receipt of input features for a point in the lidar point cloud at the input layer of the DNN, the input features are propagated through the hidden layers of the DNN. The DNN is configured to output, for each of the points in the point cloud, one or more probabilities, each probability indicating a likelihood that the point is representative of an object of a certain type. By way of example, the DNN can be configured such that the output layer is a softmax layer that outputs a first probability that the input point (e.g., the point represented by the input features provided at the input layer of the DNN) represents a first type of object, a second probability that the input point represents a second type of object, etc. through an nth probability that the input points represents an nth type of object, where the n probabilities sum to unity. In an exemplary embodiment, the output layer outputs a first probability that the input point is representative of vegetation, a second probability that the input point is representative of ground cover, and a third probability that the input point is representative of any other type of object (e.g., cars, trucks, pedestrians, bicycles, etc.). As discussed below in greater detail with respect to FIG. 4, the DNN is learned based upon labeled training data (e.g., labeled lidar point cloud data) such that the output of the DNN indicates a high probability (e.g., greater than 80%, greater than 90%, greater than 95%, etc.) that the input point is ground cover when the input point is actually representative of ground cover, a high probability that the input point is vegetation when the input point is actually representative of vegetation, etc.

The lidar post processing component 212 receives the output of the DNN (e.g., the n probabilities indicated by the output layer of the DNN) from the neural network component 210 and outputs, based upon the output of the DNN, a segmentation of the lidar point cloud (e.g., as received from the lidar sensor system 101) that indicates which points in the point cloud are representative of same objects in the driving environment of the autonomous vehicle 100. In an exemplary embodiment, the lidar post processing component 212 performs a segmentation of the lidar point cloud by excluding points from consideration that are indicated by the output of the DNN as being likely to be representative of vegetation and/or ground. Stated differently, the lidar post processing component 212 performs a segmentation of only those points in the point cloud that are indicated by the output of the DNN as not being likely to represent ground or vegetation. By excluding points representative of ground and vegetation from consideration by a segmentation algorithm, the lidar post processing component 212 can reduce errors associated with poor performance of the segmentation algorithm in identifying ground and vegetation features. For instance, excluding points representative of ground cover from consideration by a segmentation algorithm can reduce errors caused by an inability of the algorithm to distinguish between the ground and objects in contact with the ground (e.g., pedestrians' feet, car tires, or other object in contact with the ground). In another example, excluding points representative of vegetation from consideration by a segmentation algorithm can reduce errors caused by an inability of the algorithm to identify that scattered points in the point cloud are representative of a same vegetative object, such as a bush, a leafy tree branch, etc.

The lidar post processing component 212 identifies a first group of points in the point cloud that are indicated by the output of the DNN as being likely to represent ground, and/or a second group of points in the point cloud that are indicated by the output of the DNN as being likely to represent vegetation. In an embodiment, the lidar post processing component 212 can identify points that are likely to be representative of ground and/or vegetation based upon the output of the DNN and a probability threshold. For instance, the lidar post processing component 212 can label a point as being representative of ground based upon the output of the DNN indicating that the point has a probability of being ground that is above the probability threshold. In various examples, the probability threshold may be 75%, 90%, 95%, or other desirable threshold. Responsive to identifying a point as being likely to be representative of ground or vegetation (e.g., based upon the probability threshold), the lidar post processing component 212 assigns a label to the point that indicates ground or vegetation, accordingly.

Upon determining which points in the lidar point cloud are likely to be representative of ground and/or vegetation, the lidar post processing component 212 generates a segmentation of points in the point cloud that are not labeled as ground or vegetation. The segmentation comprises data indicative of which points are representative of which objects in the driving environment of the autonomous vehicle 100. By way of an example, generating the segmentation comprises assigning respective labels to each of the points in the point cloud, wherein each of the labels indicates a group to which its point belongs, each group being representative of a different object in the driving environment. The lidar post processing component 212 can generate the segmentation according to any suitable segmentation algorithm. In an example, the lidar post processing component 212 generates the segmentation based upon output of a neural network that is trained to output data indicative of whether points in a lidar point cloud are representative of same objects. In another example, the segmentation is generated based upon an algorithm that considers distance between points in the point cloud, relative angles formed by points in the point cloud, convex hulls of subsets of points in the point cloud, etc. Other approaches to generating the segmentation of the points not labeled vegetation or ground are also contemplated.

Responsive to generating the segmentation, the lidar post processing component 212 outputs the segmentation to the object recognition system 118. The object recognition system 118 outputs data indicative of one or more objects in the driving environment to the control system 120 based upon the segmentation generated by the lidar segmentation system 202. By way of example, the object recognition system 118 outputs data indicative of positions and/or types of objects in the driving environment. In exemplary embodiments, the object recognition system 118 outputs data indicative of positions and/or types of objects in the driving environment of the autonomous vehicle 100 based upon the segmentation output by the lidar segmentation system 202 and output of one or more of the additional object recognizer components 204-206. Subsequently, the control system 120 of the vehicle 100 can output control signals to at least one of the engine 106, the braking system 108, or the steering system 110 based upon the output of the object recognition system 118, such that the autonomous vehicle is controlled based at least in part upon the segmentation of the lidar point cloud generated by the lidar segmentation system 202.

In various embodiments, it may be desirable to control operation of an autonomous vehicle based at least in part on labeled data that pertains to a potential operating environment of the vehicle (e.g., a city or other region in which the autonomous vehicle is to drive). For instance, it may be desirable to control operation of an autonomous vehicle based upon a semantic map that includes data pertaining to route information (e.g., locations of streets, directions of traffic on streets, road closures, etc.) and locations of interest (e.g., restaurants, fueling/charging stations, entertainment venues, etc.). In another example, it may be desirable to control operation of an autonomous vehicle based upon a heightmap of the driving environment of the autonomous vehicle.

Referring once again to FIG. 1, the computing system 112 of the autonomous vehicle 100 further includes a data store 122 that stores labeled data 124. The labeled data 124 includes data pertaining to a potential operating environment of the autonomous vehicle 100 (e.g., an area that includes the surroundings of the vehicle 100 that make up the driving environment of the vehicle 100). The labeled data 124 is generated independent of the sensor systems 101-104 of the autonomous vehicle 100 and is labeled based upon ground truth data pertaining to the potential operating environment (e.g., based upon human input). The labeled data 124 includes a semantic map 126 of a potential operating environment of the autonomous vehicle 100 (e.g., an area that includes the surroundings of the vehicle 100 that make up the driving environment of the vehicle 100) and a heightmap 128 of the potential operating environment. The heightmap 128 comprises data indicating a height for each of a plurality of points in a two-dimensional space that comprises an overhead view of the potential operating environment of the autonomous vehicle 100. In an exemplary embodiment, the autonomous vehicle 100 can identify a fastest available route to a destination based upon the semantic map 126.

It may further be desirable to control operation of the autonomous vehicle 100 based jointly upon the labeled data 124 and the sensor signals output by the sensor systems 101-104 of the autonomous vehicle 100. For example, it may be desirable that the autonomous vehicle 100 identify that sensor data is representative of a same object in the driving environment that is also represented in the labeled data, and perform one or more functions based upon the sensor data and the labeled data 124 being representative of the same object. In order to control operation of the autonomous vehicle 100 based jointly upon sensor data and the labeled data 124, the sensor data and the labeled data 124 are aligned to ensure that sensor signals are accurately matched to corresponding information in the labeled data 124. In an example, the lidar data output by the lidar sensor system 101 is aligned with the height map 128. The lidar data and the height map 128 are aligned such that the computing system 112 can readily determine that first data in the height map 128 is representative of a first location of a first point in the lidar data. By way of example, the computing system 112 can compute a coordinate transform from a coordinate system of the lidar point cloud to a coordinate system of the height map 128 (and vice-versa). Hence, the computing system 112 can match coordinates of a point in the point cloud to coordinates in the height map 128 to determine a ground height at a position of the point.

Alignment between sensor data and the labeled data 124 can be initially achieved during calibration of systems of the autonomous vehicle 100 prior to operation of the autonomous vehicle 100 in the driving environment. By way of example, in a calibration environment the lidar sensor system 101 generates a lidar point cloud, wherein the lidar point cloud is representative of a known geometry of the calibration environment. The computing system 112 of the vehicle 100 can compute an alignment between labeled data 124 and the lidar point cloud based upon the geometry of the calibration environment being known. However, the autonomous vehicle 100 is subject to misalignment of the sensor data and the labeled data 124 over time as the autonomous vehicle 100 operates in a driving environment. Conventionally, in order to maintain alignment of sensor data and labeled data, the autonomous vehicle must be periodically recalibrated in the environment having the known geometry, requiring downtime of the autonomous vehicle and removal of the autonomous vehicle from the driving environment.

In exemplary embodiments, the autonomous vehicle 100 is configured to align sensor data from one or more of the sensor systems 101-104 with labeled data 124 in real-time during operation of the vehicle 100 in a driving environment. Referring now once again to FIG. 2, the lidar segmentation system 202 further comprises a data alignment system 214 that computes an alignment between lidar data output by the lidar sensor system 101 and the labeled data 124 based upon output of the neural network component 210. In an exemplary embodiment, the data alignment system 214 receives output of the DNN from the neural network component 210. The data alignment system 214 identifies points in the point cloud for which the output of the DNN indicates a high probability (e.g., greater than 90% probability, greater than 95% probability, greater than 99% probability) that the point is representative of ground. The data alignment system 214 then computes an alignment between the coordinate system of the lidar point cloud and the coordinate system of the heightmap 128 based upon the identified points and the heightmap 128. In general, the alignment computed by the data alignment system 214 based upon the identified points is more accurate than an alignment computed based upon a group of points in the lidar point cloud that also includes points that are not representative of ground.

Responsive to receipt of alignment data from the data alignment system 214, the lidar post processing component 212 can generate a segmentation of the lidar data based upon the labeled data 124 or update an existing segmentation of the lidar data based upon the labeled data 124. In an example, the lidar post processing component 212 receives a coordinate transform from the data alignment system 214. The coordinate transform indicates a transformation from a coordinate system of the lidar data to a coordinate system of at least one dataset in the labeled data 124. The lidar post processing component 212 employs the coordinate transform to update a segmentation based upon characteristics of points in the lidar point cloud that are indicated in the labeled data 124.

For example, the lidar post processing component 212 can identify a point in the lidar point cloud for which the output of the DNN indicates a moderate probability (e.g., 40%-80%, 50%-70%, or 55%-65%) of the point being representative of ground cover. For instance, referring again briefly to FIG. 3B, a point 326 near the bottom of a tire of the vehicle 302 in the driving environment 300 can be indicated in the output of the DNN as having a probability of 55% of being representative of ground cover (e.g., due in part to its proximity to the ground surface 324). The lidar post processing component 212 can compute, based upon the coordinate transform, coordinates of the identified point in the heightmap 128. Based upon a height of the identified point indicated in the heightmap 128, the lidar post processing component 212 can determine whether the identified point is or is not representative of ground. For example, if the height of the point as indicated in the lidar point cloud is significantly greater than the height indicated in the heightmap 128 (e.g., 20 centimeters greater, 10 centimeters greater, 5 centimeters greater), the lidar post processing component 212 can assign a label to the point indicating that the point is representative of an object other than ground. In another example, if the height of the point as indicated in the lidar point cloud is substantially similar to the height indicated in the heightmap 128 (e.g., within 20 centimeters, within 10 centimeters, within 5centimeters), the lidar post processing component 212 can assign a label to the point indicating that the point is representative of ground cover. It is to be understood that there may be uncertainty associated with heights indicated in the heightmap data 128. In exemplary embodiments, the heightmap 128 includes data indicative of an uncertainty threshold (e.g., a range of potential heights) for one or more of the heights indicated in the heightmap 128. The lidar post processing component 212 can assign a label to a point in the lidar point cloud based upon the uncertainty threshold, the label indicating that the point is representative of ground cover. For instance, if a height of a point as indicated by the lidar point cloud is within a range of potential heights indicated in the heightmap 128, the lidar post processing component 212 assigns a label to the point indicating that the point is representative of ground.

It is to be understood that the lidar post processing component 212 can assign the labels to points in the lidar point cloud based upon the alignment, as described above, prior to performing a segmentation of the lidar point cloud. In an exemplary embodiment, the data alignment system 214 receives the output of the DNN from the neural network component 210, and computes the alignment as described above. The lidar post processing component 212, based upon the alignment and the heightmap 128, evaluates points in the lidar point cloud that potentially represent ground cover, and assigns labels to those points with heights consistent with the heightmap 128. The lidar post processing component 212 can then generate the segmentation of the lidar point cloud based upon the labeled points being representative of ground.

By way of example, and not limitation, the lidar post processing component 212 can evaluate points in the lidar point cloud that are indicated by the output of the DNN as having a probability of representing ground cover that is above a threshold amount (e.g., greater than 30%, greater than 40%, greater than 50%) against heights indicated in the heightmap 128. To each point indicated by the lidar point cloud as having a height within a range of potential heights indicated in the heightmap 128, the lidar post processing component 212 assigns a label indicating that the point is representative of ground. The lidar post processing component 212 can then perform a segmentation of the remaining unlabeled points in the lidar point cloud based upon any suitable segmentation algorithm. The control system 120 can subsequently output control signals to at least one of the engine 106, the braking system 108, or the steering system 110 to control operation of the autonomous vehicle 100 based upon the segmentation of the lidar point cloud.

Figure 4:
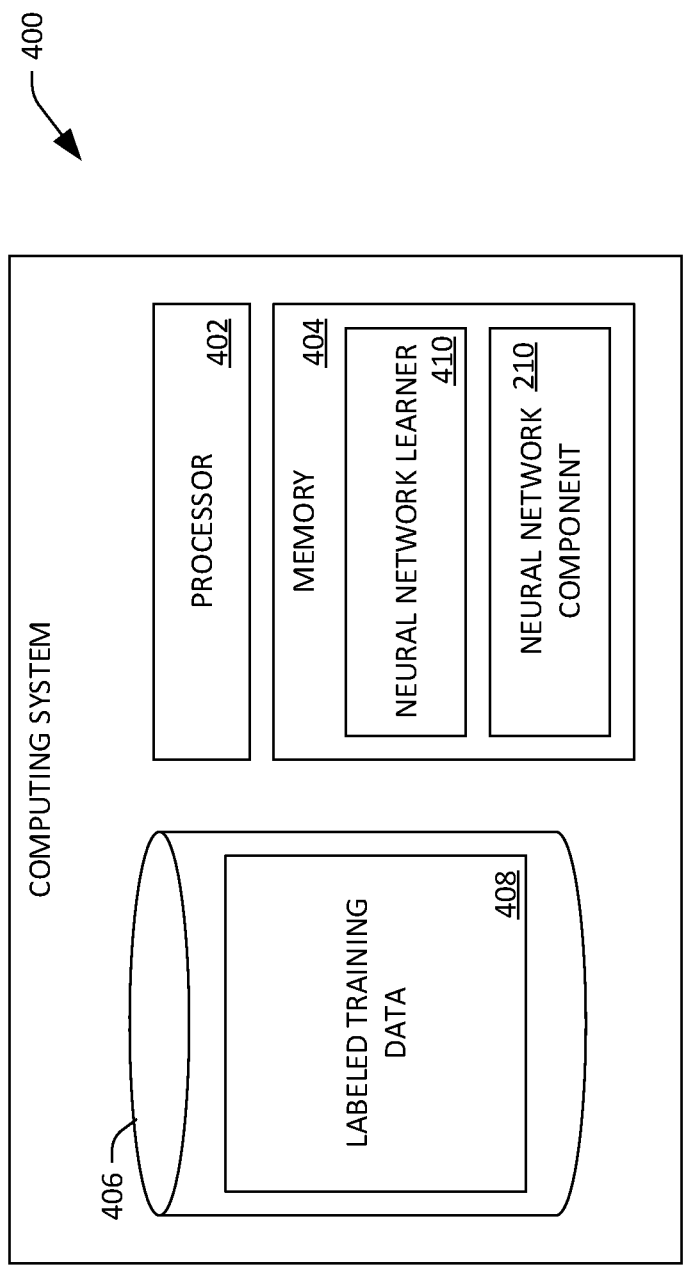
FIG. 4 is a functional block diagram of an exemplary system that is configured to learn a neural network component included in the object recognition system depicted in FIG. 2.

With reference now to FIG. 4, an exemplary computing system 400 that is configured to learn the neural network component 210 is illustrated. The computing system 400 includes a processor 402 and memory 404, wherein the memory 404 includes instructions that are executed by the processor 402. The computing system 400 additionally includes a data store 406 that comprises labeled training data 408. The memory 404 includes a neural network learner 410 that learns the neural network component 210. The neural network learner 410 receives the labeled training data 408, wherein the labeled training data 408 comprises lidar point cloud data (e.g., parameterized as described above with respect to input features of the DNN), wherein the lidar point cloud data further includes ground truth data indicating which points are representative of vegetation, and which points are representative of ground in the lidar point cloud data. The neural network learner 410 learns the neural network component 210 such that the neural network component 210 outputs a high ground probability for points in the point cloud that are representative of ground, a high vegetation probability for points representative of vegetation, and a low probability of vegetation and ground for points representative of neither vegetation nor ground. While not shown, the neural network component 210 can be validated based upon a test training data set, which is also labeled, to ensure that the neural network component 210 produces outputs with acceptable characteristics (e.g., such that the neural network component 210 outputs a high vegetation probability for points representative of vegetation and a low vegetation probability for points that are not representative of vegetation).

Figure 5:
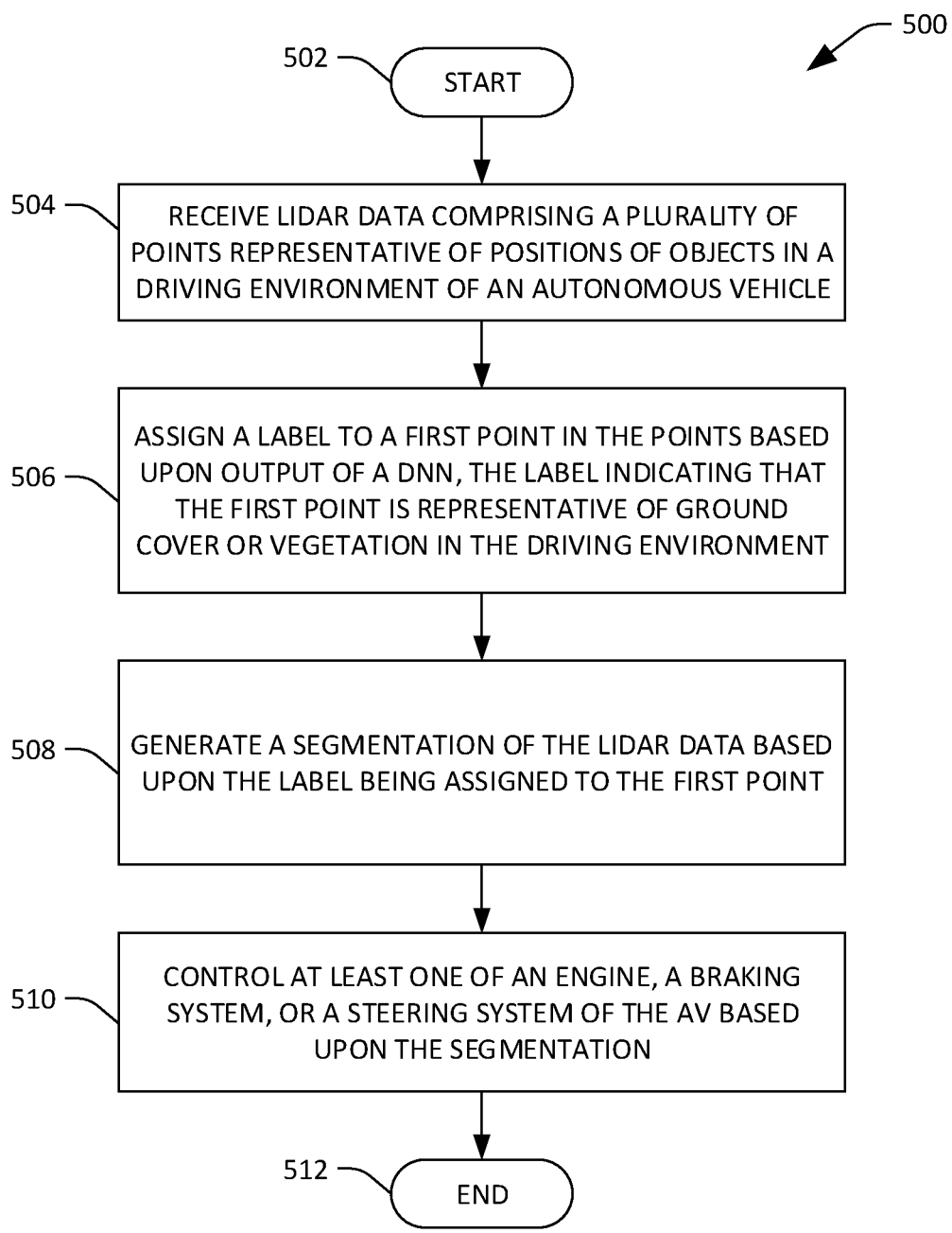
FIG. 5 is a flow diagram illustrating an exemplary methodology for controlling operation of a mechanical system of an autonomous vehicle based upon output of a lidar segmentation system.
Figure 6:
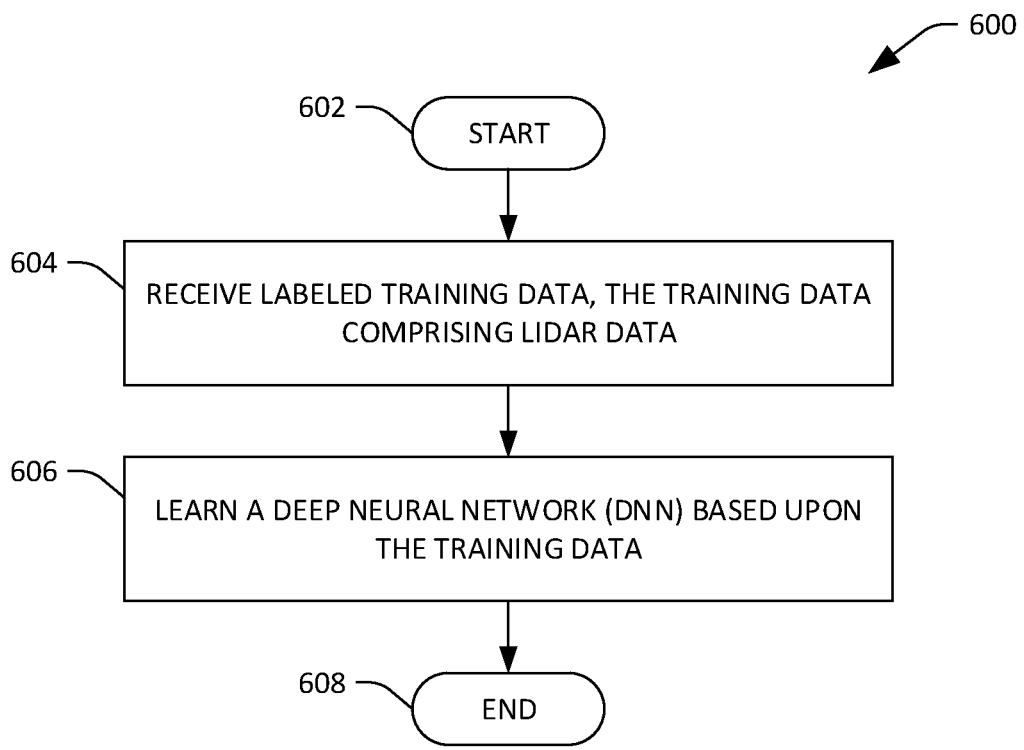
FIG. 6 is a flow diagram illustrating an exemplary methodology for learning a neural network to be included in an object recognition system of an autonomous vehicle.
Figure 7:
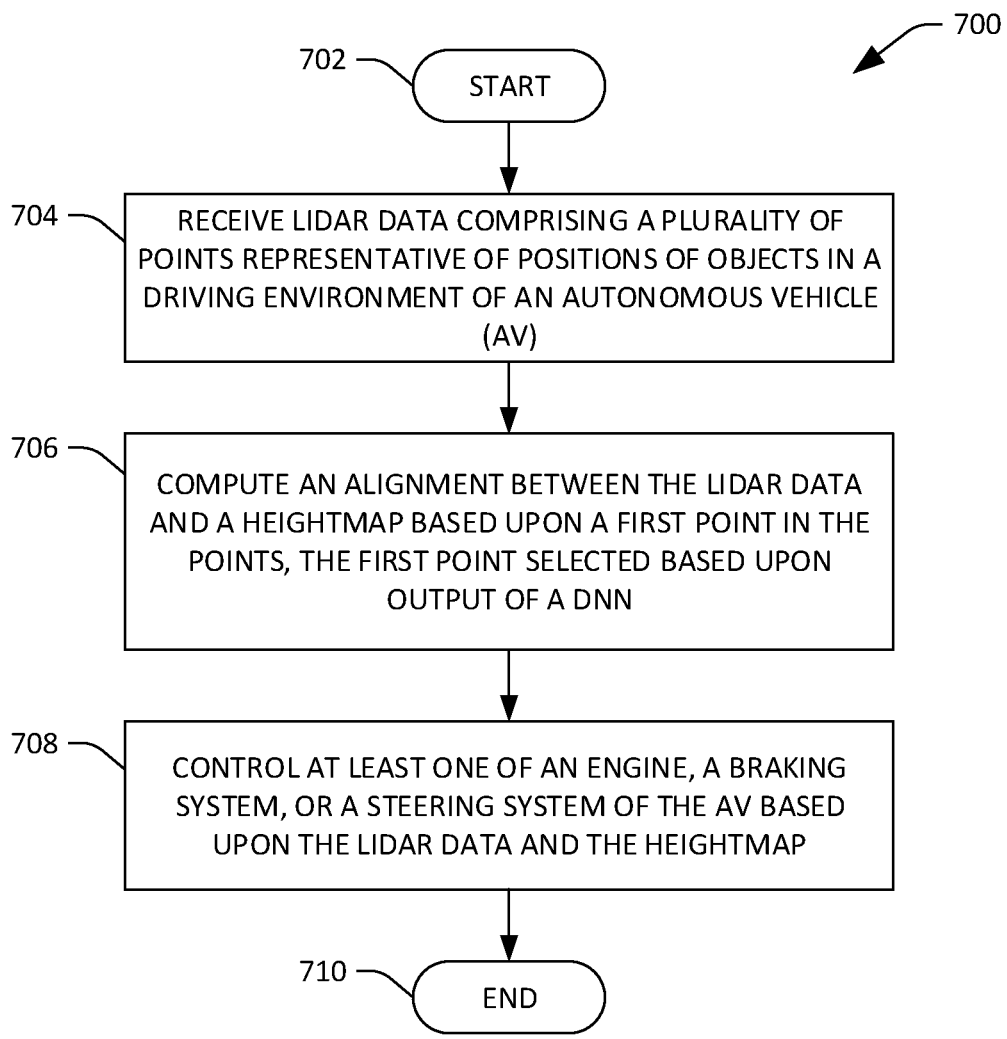
FIG. 7 is a flow diagram illustrating an exemplary methodology for controlling operation of a mechanical system of an autonomous vehicle based upon lidar data and a heightmap of a driving environment of the autonomous vehicle.

FIGS. 5-7 illustrate exemplary methodologies relating to controlling an autonomous vehicle based upon data output by a lidar data segmentation system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for controlling operation of an autonomous vehicle is illustrated. The methodology 500 starts at 502, and at 504 lidar data is received, wherein the lidar data comprises a plurality of points representative of positions of objects in a driving environment of an autonomous vehicle. At 506, a label is assigned to a first point in the points based upon output of a DNN. By way of example, responsive to receiving input features pertaining to the first point, the DNN outputs respective probabilities that the first point is representative of ground cover, vegetation, or another type of object. In a non-limiting example, the label is assigned to the first point responsive to determining that a probability of the first point being either vegetation or ground as indicated in the output of the DNN is greater than a pre-defined threshold value. The label assigned to the first point indicates that the first point is representative of ground cover or vegetation in the driving environment. At 508, a segmentation of the lidar data is generated based upon the first point being excluded from the segmentation. By generating the segmentation based upon excluding the first point from the segmentation, errors associated with poor performance of a segmentation algorithm relative to ground and vegetation features are avoided. At 510, at least one of an engine, a braking system, or a steering system of the autonomous vehicle is controlled based upon the segmentation generated at 508. For example, an object recognition system of the autonomous vehicle can generate a prediction of future behavior of one or more objects in the driving environment based upon the segmentation, and can control steering of the autonomous vehicle based upon such prediction. The methodology 500 completes at 512.

Turning now to FIG. 6, an exemplary methodology 600 that facilitates learning a DNN is illustrated, wherein the DNN is configured for use in a lidar segmentation system of an autonomous vehicle. The methodology 600 starts at 602, and at 604 labeled training data is received, wherein the training data comprises labeled lidar point cloud data. At 606, a DNN is learned based upon the training data. The DNN is configured such that responsive to receiving a point in a lidar point cloud as input (e.g., when the DNN receives a vector of input features representative of the point at an input layer of the DNN), the DNN outputs a plurality of probabilities, each probability indicative of a likelihood that the point represents a different respective type of object. For instance, responsive to receiving a point in a lidar point cloud as input, the DNN outputs a first probability that the point is representative of vegetation, a second probability that the point is representative of ground, and a third probability that the point is representative of some other type of object, where the three probabilities sum to unity. The DNN is learned at 606 such that the output of the DNN indicates a high probability that the point is representative of vegetation when the input point is a point representative of vegetation, the output of the DNN indicates a high probability that the point is representative of ground when the input point is a point representative of ground, and the output of the DNN indicates a high probability that the point is representative of some other type of object when the input point is a point representative of neither ground nor vegetation. The methodology 600 completes at 608.

Referring now to FIG. 7, an exemplary methodology 700 that facilitates controlling operation of an autonomous vehicle based upon sensor data and labeled data is illustrated. The methodology 700 begins at 702 and at 704, lidar data is received, wherein the lidar data comprises a plurality of points representative of positions of objects in a driving environment of an autonomous vehicle. At 706, an alignment is computed between the lidar data and a heightmap based upon a first point in the points, wherein the first point is selected based upon output of a DNN indicating that the first point is representative of ground. At 708, at least one of an engine, a braking system, or a steering system of the autonomous vehicle is controlled based upon the lidar data and the heightmap, wherein the alignment computed at 706 facilitates joint consideration of the lidar data and the heightmap. By way of example, a segmentation of the lidar data can be generated based at least in part upon the heightmap being aligned with the lidar data. The methodology 700 ends at 710.

Figure 8:
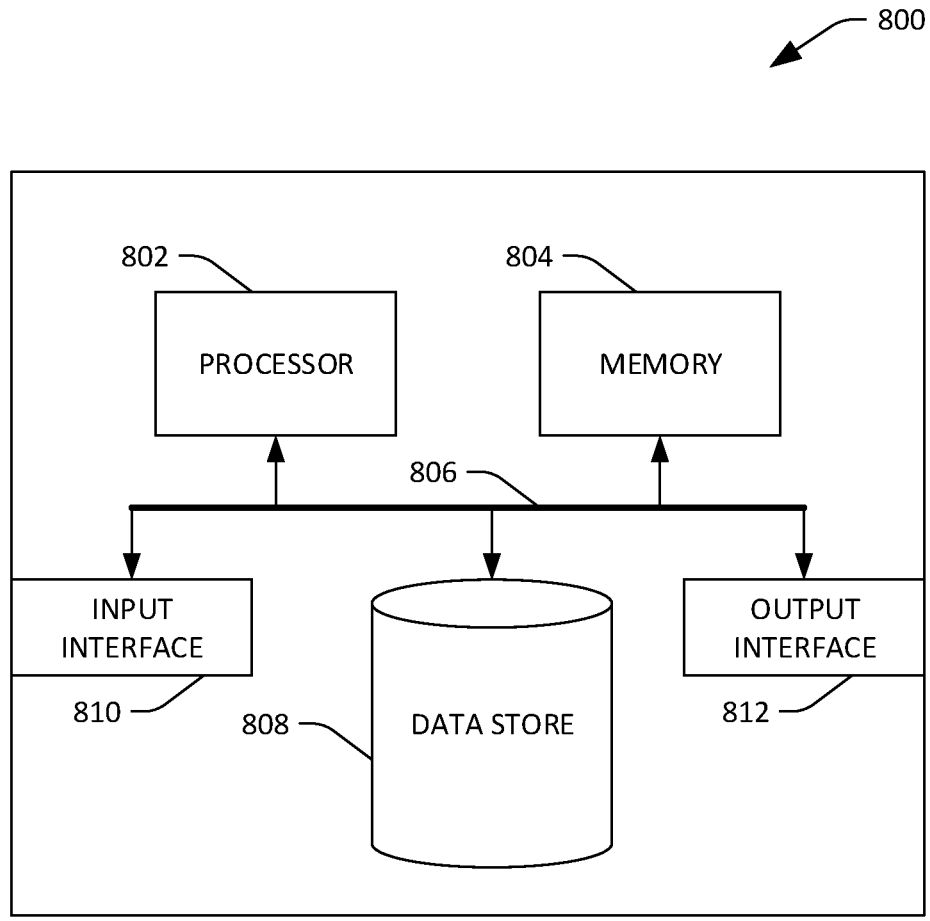
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be or include the computing system 112 or the computing system 400. The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store point cloud data, vectors of output features for points in a point cloud, segmentation data, training data, etc.

The computing device 800 additionally includes a data store 808 that is accessible by the processor 802 by way of the system bus 806. The data store 808 may include executable instructions, sensor data, output feature vector data, training data, segmentation data, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the engine 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
an engine;
a braking system;
a steering system;
a lidar sensor; and
a computing system that is in communication with the engine, the braking system, the steering system, and the lidar sensor, wherein the computing system comprises:
a processor; and
memory that stores instructions that, when executed by the processor, cause the processor to perform acts comprising:
receiving lidar data, the lidar data based upon output of the lidar sensor, the lidar data comprising a plurality of points representative of positions of objects in a driving environment of the AV;
computing an alignment between the lidar data and a heightmap based upon a first point in the points, the heightmap representative of height of ground cover at a plurality of locations in the driving environment, the first point selected based upon output of a deep neural network (DNN); and
controlling at least one of the engine, the braking system, or the steering system during operation of the AV in the driving environment based upon the lidar data and the heightmap being aligned to one another.

2. The AV of claim 1, the output of the DNN indicative of a probability that the first point is representative of ground cover, the DNN configured to output the probability responsive to receipt of the first point as input to the DNN.

3. The AV of claim 2, the first point selected for computing the alignment based upon the probability exceeding a predefined threshold.

4. The AV of claim 3, wherein the predefined threshold is 99%.

5. The AV of claim 3, the plurality of points being first points, wherein the alignment is computed based further upon a second plurality of points, the second points being a subset of the first points, the output of the DNN being further indicative of respective probabilities that each of the second points is representative of ground cover, wherein each of the respective probabilities associated with the second points exceeds the predefined threshold.

6. The AV of claim 1, wherein controlling at least one of the engine, the braking system, or the steering system based upon the lidar data and the heightmap comprises:
generating a segmentation of the lidar data based upon the heightmap; and
controlling at least one of the engine, the braking system, or the steering system based upon the segmentation.

7. The AV of claim 6, the plurality of points being a first plurality of points, wherein generating the segmentation of the lidar data based upon the heightmap comprises:
assigning labels to a second plurality of points based upon heights indicated in the heightmap, the second points being a subset of the first points, the labels indicating that the second points are representative of ground; and
generating the segmentation based upon unlabeled points in the first points.

8. The AV of claim 1, wherein the computing the alignment is performed in real time during operation of the AV in the driving environment.

9. The AV of claim 1, wherein controlling at least one of the engine, the braking system, or the steering system based upon the lidar data and the heightmap comprises:
updating a segmentation of the lidar data based upon the heightmap; and
controlling at least one of the engine, the braking system, or the steering system based upon the updated segmentation.

10. A method for controlling operation of an autonomous vehicle (AV), comprising:
receiving lidar data from a lidar sensor system of the AV, the lidar data based upon output of a lidar sensor included on the AV, the lidar data comprising a plurality of points representative of positions of objects in a driving environment of the AV;

computing an alignment between the lidar data and a heightmap based upon a first point in the points, the heightmap representative of height of ground cover at a plurality of locations in the driving environment, the first point selected for the computing based upon output of a deep neural network (DNN); and controlling at least one of an engine of the AV, a braking system of the AV, or a steering system of the AV during operation of the AV in the driving environment based upon the lidar data and the heightmap being aligned to one another.

11. The method of claim 10, wherein the DNN is configured to output data indicative of a probability that a point received as input to the DNN is representative of ground cover in the driving environment.

12. The method of claim 11, wherein the first point is selected for the computing based upon the output of the DNN indicating a probability of the first point being representative of ground cover as being greater than 90%.

13. The method of claim 12, the first point selected for the computing based upon the output of the DNN indicating the probability of the first point being representative of ground cover as being greater than 95%.

14. The method of claim 12, the first point selected for the computing based upon the output of the DNN indicating the probability of the first point being representative of ground cover as being greater than 99%.

15. The method of claim 11, the plurality of points being first points, wherein the alignment is computed based upon a second plurality of points, the second points being a subset of the first points and including the first point, the output of the DNN being indicative of respective probabilities that each of the second points is representative of ground cover, wherein the second points are selected for computing the alignment based upon each of the respective probabilities associated with the second points exceeding a predefined threshold.

16. The method of claim 10, wherein controlling at least one of the engine, the braking system, or the steering system based upon the lidar data and the heightmap comprises:

generating a segmentation of the lidar data based upon the heightmap; and controlling at least one of the engine, the braking system, or the steering system based upon the segmentation.

17. The method of claim 16, the plurality of points being a first plurality of points, wherein generating the segmentation of the lidar data based upon the heightmap comprises:

assigning labels to a second plurality of points based upon heights indicated in the heightmap, the second points being a subset of the first points, the labels indicating that the second points are representative of ground; and generating the segmentation based upon unlabeled points in the first points.

18. The method of claim 10, wherein the computing the alignment is performed in real time during operation of the AV in the driving environment.

19. The method of claim 10, wherein controlling at least one of the engine, the braking system, or the steering system based upon the lidar data and the heightmap comprises:

updating a segmentation of the lidar data based upon the heightmap; and controlling at least one of the engine, the braking system, or the steering system based upon the updated segmentation.

20. An autonomous vehicle (AV) comprising:

a computer-readable storage medium comprising instructions that, when executed by a processor, cause the processor to perform acts comprising:

receiving lidar data from a lidar sensor system of the AV, the lidar data based upon output of a lidar sensor included on the AV, the lidar data comprising a plurality of points representative of positions of objects in a driving environment of the AV;

computing, in real time during operation of the AV in the driving environment, an alignment between the lidar data and a heightmap based upon a first point in the points, the heightmap representative of height of ground cover at a plurality of locations in the driving environment, the first point selected for the computing based upon output of a deep neural network (DNN); and controlling at least one of an engine of the AV, a braking system of the AV, or a steering system of the AV during operation of the AV in the driving environment based upon the lidar data and the heightmap being aligned to one another.

* * * * *